United States Patent
Hitchcock et al.

(10) Patent No.: US 11,371,301 B2
(45) Date of Patent: Jun. 28, 2022

(54) LOST CIRCULATION SHAPE DEPLOYMENT

(71) Applicant: Saudi Arabian Oil Company, Dhahran (SA)

(72) Inventors: Graham Hitchcock, Aberdeenshire (GB); Sakethraman Mahalingam, Aberdeenshire (GB)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 177 days.

(21) Appl. No.: 16/850,804

(22) Filed: Apr. 16, 2020

(65) Prior Publication Data
US 2020/0248512 A1 Aug. 6, 2020

Related U.S. Application Data

(63) Continuation-in-part of application No. 16/268,088, filed on Feb. 5, 2019, now Pat. No. 11,078,748.

(51) Int. Cl.
*E21B 21/00* (2006.01)
*E21B 47/10* (2012.01)
(Continued)

(52) U.S. Cl.
CPC .......... *E21B 21/003* (2013.01); *E21B 33/138* (2013.01); *E21B 47/10* (2013.01); *E21B 49/00* (2013.01)

(58) Field of Classification Search
CPC ...... E21B 21/003; E21B 33/138; E21B 47/10; E21B 49/00
See application file for complete search history.

(56) References Cited

U.S. PATENT DOCUMENTS 2,626,779 A 1/1953 Armentrout
4,505,334 A 3/1985 Doner et al.
(Continued)

FOREIGN PATENT DOCUMENTS

WO 9828517 A1 7/1998
WO WO-2010117549 A1 * 10/2010 ............. E21B 47/08
(Continued)

OTHER PUBLICATIONS

International Search Report and Written Opinion of PCT Application No. PCT/US2021/027165 dated Jul. 1, 2021: pp. 1-14.
(Continued)

*Primary Examiner* — Crystal J. Lee
(74) *Attorney, Agent, or Firm* — Bracewell LLP; Constance G. Rhebergen; Linda L. Morgan

(57) ABSTRACT

Methods and systems for sealing a lost circulation zone associated with a subterranean include determining geophysical data of the lost circulation zone. An available range of lost circulation shape data and an available range of lost circulation material data is provided. The geophysical data, the available range of lost circulation shape data, and the available range of lost circulation material data are part of a fixed data set. An initial lost circulation mix is determined from the fixed data set. An initial drill string downhole flow rate and an initial annulus uphole flow rate are determined and an initial loss volume is calculated. The initial lost circulation mix is delivered into the subterranean well. A revised drill string downhole flow rate and a revised annulus uphole flow rate are determined and a revised loss volume is calculated.

10 Claims, 7 Drawing Sheets

(51) Int. Cl.
*E21B 49/00* (2006.01)
*E21B 33/138* (2006.01)

(56) References Cited

U.S. PATENT DOCUMENTS

| | | | |
|---|---|---|---|
| 5,309,995 | A | 5/1994 | Gonzalez et al. |
| 5,485,882 | A | 1/1996 | Bailey et al. |
| 5,803,666 | A | 9/1998 | Keller |
| 6,170,531 | B1 | 1/2001 | Jung et al. |
| 7,343,974 | B2 | 3/2008 | Cowan |
| 7,537,418 | B2 | 5/2009 | Deal et al. |
| 7,647,964 | B2 | 1/2010 | Akbar et al. |
| 7,770,666 | B2 | 8/2010 | Allen |
| 7,923,413 | B2 | 4/2011 | Ghassemzadeh |
| 8,151,633 | B2 | 4/2012 | Jamison et al. |
| 8,231,947 | B2 | 7/2012 | Vaidya et al. |
| 8,271,246 | B2 | 9/2012 | Leonard et al. |
| 8,459,353 | B2 | 6/2013 | Hughes et al. |
| 8,567,491 | B2 | 10/2013 | Lurie |
| 8,672,057 | B2 | 3/2014 | Dupriest et al. |
| 8,685,903 | B2 | 3/2014 | Ravi et al. |
| 8,726,990 | B2 | 5/2014 | Karcher et al. |
| 9,631,468 | B2 | 4/2017 | Miller |
| 2002/0147113 | A1 | 10/2002 | Green |
| 2008/0147367 | A1* | 6/2008 | Massingill ............ E21B 21/062 703/10 |
| 2010/0193244 | A1 | 8/2010 | Hoskins |
| 2013/0068478 | A1 | 3/2013 | Allen et al. |
| 2013/0284518 | A1 | 10/2013 | Wu et al. |
| 2015/0008004 | A1 | 1/2015 | Kirkpatrick |
| 2015/0020908 | A1 | 1/2015 | Warren |
| 2016/0237767 | A1* | 8/2016 | Snoswell ............... C09K 8/035 |
| 2016/0244654 | A1 | 8/2016 | Way et al. |
| 2016/0333247 | A1* | 11/2016 | Whitfill .................. C09K 8/516 |
| 2018/0016885 | A1 | 1/2018 | Collins et al. |
| 2019/0111401 | A1 | 4/2019 | Lucas et al. |
| 2019/0249062 | A1 | 8/2019 | Arfaj et al. |

FOREIGN PATENT DOCUMENTS

| | | |
|---|---|---|
| WO | 2012170382 A1 | 12/2012 |
| WO | 2015061420 A1 | 4/2015 |
| WO | 2015071787 A1 | 5/2015 |

OTHER PUBLICATIONS

International Search Report and Written Opinion for related PCT application PCT/US2020/016786 dated Jun. 5, 2020.
Chang et al., "A nonlinear packing model for multi-sized particle mixtures", Powder Technology, 336, pp. 449-464, 2018.
Mortadha Turkialsaba, "Investigation of lost circulation materials impact on fracture gradient", Doctoral Dissertations, 2437, 2015.

* cited by examiner

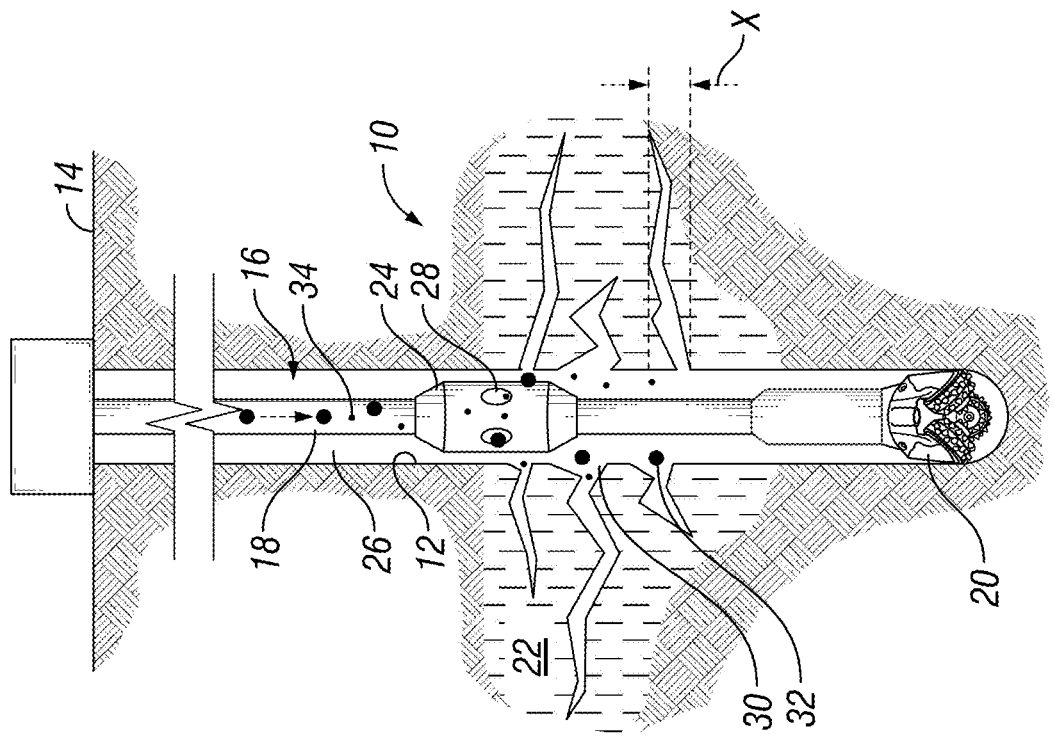
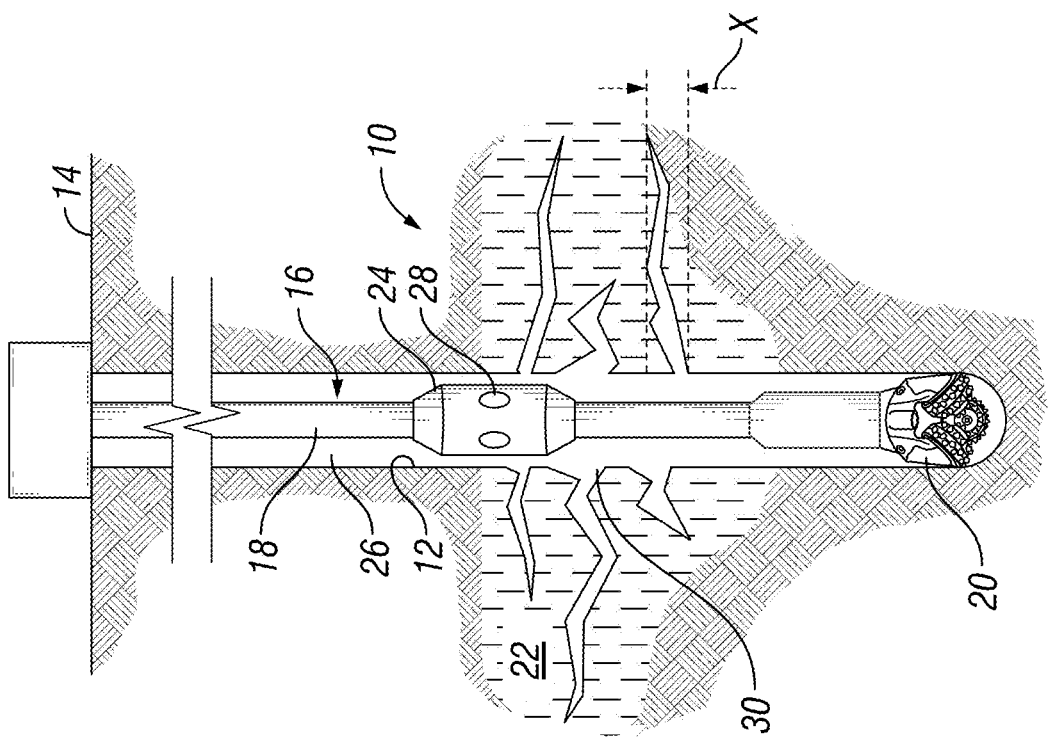

LOST CIRCULATION SHAPE DEPLOYMENT

CROSS REFERENCE TO RELATED APPLICATION

This application is a continuation in part of, and claims priority to and the benefit of, co-pending U.S. application Ser. No. 16/268,088, filed Feb. 5, 2019, titled "Lost Circulation Shape," the full disclosure of which is hereby incorporated herein by reference in its entirety for all purposes.

BACKGROUND OF THE DISCLOSURE

1. Field of the Disclosure

The present disclosure relates to subterranean developments, and more specifically, the disclosure relates to managing lost circulation associated with a subterranean well.

2. Description of the Related Art

During the drilling of subterranean wells, such as subterranean wells used in hydrocarbon development operations, drilling mud and other fluids can be pumped into the well. In certain drilling operations, the wellbore of the subterranean well can pass through a zone that has induced or natural fractures, are cavernous, or otherwise have an increased permeability, which is known as a lost circulation zone. In such a case, the drilling mud and other fluids that are pumped into the well can flow into the lost circulation zone and become irretrievable.

Lost circulation can be encountered during any stage of hydrocarbon development operations. Lost circulation can be identified when drilling fluid that is pumped into the subterranean well returns partially or does not return to the surface. While some fluid loss is expected, excessive fluid loss is not desirable from a safety, an economical, or an environmental point of view. Lost circulation can result in difficulties with well control, borehole instability, pipe sticking, unsuccessful production tests, poor hydrocarbon production after well completion, and formation damage due to plugging of pores and pore throats by mud particles. In extreme cases, lost circulation problems may force abandonment of a well.

SUMMARY OF THE DISCLOSURE

When unacceptable drilling fluid losses are encountered, conventional lost circulation materials are deployed with the drilling fluid from the surface. The revised fluid that includes the conventional lost circulation materials is pumped downhole as part of the standard well circulation system. The revised fluid passes through a circulation port to plug and pressure seal the exposed formation at the point where losses are occurring. Once sealing has occurred and acceptable fluid loss control is established, drilling operations can resume. Conventional currently available lost circulation material is most effective at sealing regularly shaped formation cavities with widths up to approximately 4-6 millimeters (mm). In cavities with larger widths, effective sealing is often both challenging and costly.

Embodiments of this disclosure provide systems and methods of ensuring an optimized combination of lost circulation shape shapes, sizes and volume are deployed in an optimized sequence. The deployment mix of lost circulation shape is dependent on the type loss formation being treated, lost circulation material used and drilling fluid used. The composition and the delivery sequence of the lost circulation shape and the lost circulation material can be determined from fixed data, such as geophysical data relating to the lost circulation zone, the available lost circulation shapes, and the available lost circulation material. A batch disposal system can be used to prepare the deployment mix and to fill the lost circulation shapes with wetting fluid.

The lost circulation shape can be deployed with the conventional lost circulation material. The lost circulation shape is a hollow perforated geometric shape that can fill with wetting fluid and have a generally neutral buoyancy in the drilling fluid. Due to this generally neutral buoyancy the lost circulation shape can move downhole freely with the drilling fluid and exit the drill string through the circulation port with the conventional lost circulation material. The lost circulation shape would be drawn into thief zone cavities or vugulars. The lost circulation shape can act as a trap for the conventional lost circulation material and allow for accumulation and bridging of the lost circulation material onto the lost circulation shape. This will result in eventual plugging of the formation.

In an embodiment of this disclosure, a method for sealing a lost circulation zone associated with a subterranean well includes determining geophysical data of the lost circulation zone. An available range of lost circulation shape data is provided. An available range of lost circulation material data is provided. The geophysical data, the available range of lost circulation shape data, and the available range of lost circulation material data are part of a fixed data set. An initial lost circulation mix is determined from the fixed data set. An initial drill string downhole flow rate and an initial annulus uphole flow rate are determined and an initial loss volume is calculated. The initial lost circulation mix is delivered into the subterranean well. A revised drill string downhole flow rate and a revised annulus uphole flow rate are determined and a revised loss volume is calculated.

In alternate embodiments, the method can further include determining an initial lost circulation mix delivery sequence from the fixed data set. Delivering the initial lost circulation mix into the subterranean well can include delivering the initial lost circulation mix in the initial lost circulation mix delivery sequence. A revised lost circulation mix can be determined from the revised loss volume. The revised lost circulation mix can be delivered into the subterranean well. A revised lost circulation mix delivery sequence can be determined from the revised loss volume. Delivering the revised lost circulation mix into the subterranean well can include delivering the revised lost circulation mix in the revised lost circulation mix delivery sequence.

In other alternate embodiments, the geophysical data can include a cavity surface area. Providing the available range of lost circulation shape data can include providing the available range of lost circulation shape data for a lost circulation shape that is a hollow body having an outer skin and an open interior chamber. The outer skin can include a plurality of perforations that extend through the outer skin, providing fluid communication between an exterior of the lost circulation shape and the open interior chamber. The plurality of perforations can be sized to prohibit a passage of lost circulation material between the exterior of the lost circulation shape and the open interior chamber.

In yet other alternate embodiments, delivering the initial lost circulation mix into the subterranean well can include filling an open interior chamber of a lost circulation shape with a wetting fluid. The lost circulation shape can have an average lost circulation shape density. A difference between the average lost circulation shape density and a drilling fluid density can be 20% or less of the drilling fluid density. The lost circulation shape can include a filling hole extending through an outer skin and having a diameter in a range of 2.5 mm to 5 mm. Filling the open interior chamber of the lost circulation shape can include delivering the wetting fluid into the open interior chamber through the filling hole.

In still other alternate embodiments, a lost circulation shape can be sized to be introduced into cavities of the lost circulation zone, forming a wedged lost circulation shape. The method can further include trapping lost circulation material with the wedged lost circulation shape to seal the lost circulation zone. An annular space can be defined between an outer diameter surface of a drill string and an inner diameter surface of a wellbore of the subterranean well. Delivering the initial lost circulation mix into the subterranean well can include circulating the initial lost circulation mix through the drill string within a drilling fluid traveling downhole within the drill string, through a circulating port, and into the annular space.

In an alternate embodiment of this disclosure, a method for sealing a lost circulation zone associated with a subterranean well includes determining geophysical data of the lost circulation zone. An available range of lost circulation shape data is provided and an available range of lost circulation material data is provided. The geophysical data, the available range of lost circulation shape data, and the available range of lost circulation material data are part of a fixed data set. An initial lost circulation mix is determined from the fixed data set. The initial lost circulation mix includes a lost circulation shape, a lost circulation material, and a wetting fluid. A batch disposal system is instructed to prepare the lost circulation shape. The initial lost circulation mix is delivered into the subterranean well.

In alternate embodiments, the batch disposal system can include a plurality of supply hoppers. Each of the plurality of supply hoppers can contain lost circulation shapes of the available range of lost circulation shapes. The batch disposal system can include a control unit and the method can further include controlling an amount of the lost circulation shapes delivered from each of the plurality of supply hoppers with the control unit.

In other alternate embodiments, the batch disposal system can include a wetting unit and the method can further include mixing the lost circulation shape and the wetting fluid within the wetting unit. The method can further include filling an open interior chamber of the lost circulation shape with the wetting fluid within the wetting unit. Alternately, the batch disposal system can include an additive manufacturing unit, and the method can include directing the additive manufacturing unit to form the lost circulation shape.

In yet another alternate embodiment of this disclosure, a system for sealing a lost circulation zone associated with a subterranean well includes an initial lost circulation mix. A composition of the initial lost circulation mix is derived from geophysical data of the lost circulation zone, an available range of lost circulation shape data, and an available range of lost circulation material data. The initial lost circulation mix includes a lost circulation shape, a lost circulation material, and a wetting fluid. A batch disposal system is operable to deliver the lost circulation shape. A drill string is operable to deliver the initial lost circulation mix into the subterranean well.

In alternate embodiments, the lost circulation shape can be a hollow body having an outer skin and an open interior chamber. The outer skin can include a plurality of perforations that extend through the outer skin, providing fluid communication between an exterior of the lost circulation shape and the open interior chamber. The plurality of perforations can be sized to prohibit a passage of the lost circulation material between the exterior of the lost circulation shape and the open interior chamber. The open interior chamber of the lost circulation shape can include the wetting fluid having a wetting fluid density. The lost circulation shape can have an average lost circulation shape density. A difference between the average lost circulation shape density and a drilling fluid density can be 20% or less of the drilling fluid density. The lost circulation shape can include a filling hole extending through the outer skin and having a diameter in a range of 2.5 mm to 5 mm.

In yet other alternate embodiments, the batch disposal system can include a plurality of supply hoppers. Each of the plurality of supply hoppers can containing lost circulation shapes of the available range of lost circulation shapes. The batch disposal system can include a control unit operable to control an amount of the lost circulation shapes delivered from each of the plurality of supply hoppers. The batch disposal system can include a wetting unit, operable for mixing the lost circulation shape and the wetting fluid within the wetting unit. Alternately, the batch disposal system can includes an additive manufacturing unit operable to form the lost circulation shape.

BRIEF DESCRIPTION OF THE DRAWINGS

So that the manner in which the features, aspects and advantages of the embodiments of this disclosure, as well as others that will become apparent, are attained and can be understood in detail, a more particular description of the disclosure may be had by reference to the embodiments that are illustrated in the drawings that form a part of this specification. It is to be noted, however, that the appended drawings illustrate only certain embodiments of the disclosure and are not to be considered limiting of the disclosure's scope, for the disclosure may admit to other equally effective embodiments.

FIG. 1 is a section view of a subterranean well with a drill string having a circulating sub, in accordance with an embodiment of this disclosure.

FIG. 2 is a section view of a subterranean well with the drill string having a circulating sub of FIG. 1, shown delivering lost circulations spheres to a lost circulation zone.

DETAILED DESCRIPTION

Figure 3:
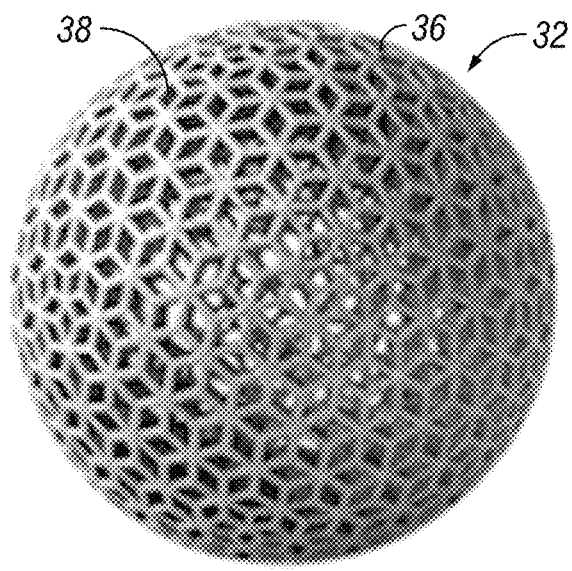
FIGS. 3-7 are perspective views of lost circulation shapes with example perforation patterns, in accordance with an embodiment of this disclosure.

The disclosure refers to particular features, including process or method steps. Those of skill in the art understand that the disclosure is not limited to or by the description of embodiments given in the specification. The subject matter of this disclosure is not restricted except only in the spirit of the specification and appended Claims.

Those of skill in the art also understand that the terminology used for describing particular embodiments does not limit the scope or breadth of the embodiments of the disclosure. In interpreting the specification and appended Claims, all terms should be interpreted in the broadest possible manner consistent with the context of each term. All technical and scientific terms used in the specification and appended Claims have the same meaning as commonly understood by one of ordinary skill in the art to which this disclosure belongs unless defined otherwise.

As used in the Specification and appended Claims, the singular forms "a", "an", and "the" include plural references unless the context clearly indicates otherwise.

As used, the words "comprise," "has," "includes", and all other grammatical variations are each intended to have an open, non-limiting meaning that does not exclude additional elements, components or steps. Embodiments of the present disclosure may suitably "comprise", "consist" or "consist essentially of" the limiting features disclosed, and may be practiced in the absence of a limiting feature not disclosed. For example, it can be recognized by those skilled in the art that certain steps can be combined into a single step.

Where a range of values is provided in the Specification or in the appended Claims, it is understood that the interval encompasses each intervening value between the upper limit and the lower limit as well as the upper limit and the lower limit. The disclosure encompasses and bounds smaller ranges of the interval subject to any specific exclusion provided.

Where reference is made in the specification and appended Claims to a method comprising two or more defined steps, the defined steps can be carried out in any order or simultaneously except where the context excludes that possibility.

Looking at FIG. 1, subterranean well 10 can have wellbore 12 that extends to an earth's surface 14. Subterranean well 10 can be an offshore well or a land based well, and can be used for producing hydrocarbons from subterranean hydrocarbon reservoirs. Drill string 16 can be delivered into and located within wellbore 12. Drill string 16 can include tubular member 18 and bottom hole assembly 20. Tubular member 18 can extend from surface 14 into subterranean well 10. Bottom hole assembly 20 can include, for example, drill collars, stabilizers, reamers, shocks, a bit sub and the drill bit. Drill string 16 can be used to drill wellbore 12. In certain embodiments, tubular member 18 is rotated to rotate the bit to drill wellbore 12.

Wellbore 12 can be drilled through lost circulation zone 22. In embodiments lost circulation zone 22 is a layer of a subterranean formation that is located uphole of a hydrocarbon formation, downhole of a hydrocarbon formation, or between separate hydrocarbon formations. In certain embodiments, drill string 16 can pass through a cased section of wellbore 12 of subterranean well 10 in order to reach uncased open hole portion of wellbore 12.

A system for sealing lost circulation zone 22 associated with subterranean well 10 includes a circulating port to provide downhole fluid circulation. The circulating port provides fluid communication between an inner bore of drill string 16 and annular space 26. In commonly available systems a circulation flow path for drill string 16 can include flow of fluid in a downhole direction through the internal bore of drill string 16. The fluid can flow out of the drill bit and flow in an uphole direction through annular space 26. The exit of the flow of fluid through the drill bit is through a circulating port that is a drill bit nozzle. Drill bit nozzles can be intentionally small and specifically sized to create a backpressure in the drill string.

Annular space 26 is the elongated annular shaped space that extends a length of drill string 16 and is defined between an outer diameter surface of drill string 16 and an inner diameter surface wellbore 12. During downhole fluid circulation, fluids can flow downhole through the inner bore of drill string 16 and uphole through annular space 26. In reverse circulation, fluids can flow downhole through annular space 26 and uphole through the inner bore of drill string 16.

In the example embodiment, drill string 16 can include circulating sub 24. Circulating sub 24 can be a circulating sub known and commonly available in the industry for circulating fluids downhole. Circulating sub 24 can include circulating sub port 28, which is a circulating port. Circulating sub port 28 extends through a sidewall of circulating sub 24 and provides fluid communication between the inner bore of drill string 16 and annular space 26. In alternate embodiments, bottom hole assembly 20 can include the circulating port. Circulating sub 24 provides an alternative circulation flow path to using drill bit nozzles. Circulating sub 24 provides for a circulation port that is located uphole of the drill bit and can have ports that are larger than common drill bit nozzles.

The system for sealing lost circulation zone 22 can be used to seal the entry of cavity 30 of lost circulation zone 22 that has a cross sectional dimension X up to 25 mm. In certain embodiments, lost circulation zone 22 cannot be sealed with some currently available lost circulation material due to the large cross sectional dimension X of cavity 30, or the resulting surface area of cavity 30. The cavity surface area is the open area of cavity 30 measured along the inner diameter surface of wellbore 12. Cavity 30 can be, for example, vugular or cavernous faults.

Looking at FIG. 2, after bottom hole assembly 20 has reached or passed through lost circulation zone 22, a combination of lost circulation shape 32 and lost circulation material 34 can be used to seal cavities 30 of lost circulation zone 22.

In the example embodiment of FIG. 2, lost circulation shape 32 and lost circulation material 34 are pumped in a direction downhole through drill string 16, and exit circulating sub port 28 to reach annular space 26 for delivery to lost circulation zone 22.

Looking at FIG. 3, lost circulation shape 32 is a hollow body having an outer skin 36 that defines the shape of lost circulation shape 32 and an open interior chamber. Outer skin 36 can have a thickness in a range of 0.5 mm to 2.5 mm. In alternate embodiments, such as when a metallic material is used to form lost circulation shape 32, outer skin 36 can have a thickness as small as 0.1 mm. Lost circulation shape 32 can have a variety of diameters. In general, a smaller diameter lost circulation shape 32 can have a smaller thickness of outer skin 36 and a larger diameter lost circulation shape 32 can have a larger thickness of outer skin 36. In certain embodiments, the thickness of outer skin 36 can be directly proportional to the diameter of lost circulation shape 32. In alternate embodiments, when lost circulation shape 32 has a larger diameter, lost circulation shape 32 can include an internal support structure, such as a web type structure, to provide internal support to outer skin 36.

In example embodiments shown, lost circulation shape 32 is a sphere, a shape that includes both square and triangular shaped surfaces, or a cube. In alternate embodiments, lost circulation shape 32 can have other three dimensional geometric shapes. As an example, lost circulation shape 32 can generally have the shape of a cube, ovoid, egg, hyper rectangle, triangular prism, pyramid, cone, or cylinder.

Lost circulation shape 32 can have a sufficient size to seal lost circulation zone 22, without being so large in size that lost circulation shape 32 cannot fit through the circulation port. Lost circulation shape 32 is sized to flow through the circulation port with a drilling fluid in an unrestricted manner. In certain embodiments, a mix of various sizes and shapes of lost circulation shapes 32 can be used for sealing cavities 30 of various sizes.

In certain embodiments, lost circulation shape 32 can be formed in a variety of sizes. In certain embodiments, the smallest of lost circulation shape 32 has a minimum size. The minimum size of lost circulation shape 32 is such that the smallest minimum hypothetical sphere in which lost circulation shape 32 having the minimum size could fit has a diameter of 5 mm, regardless of the geometric shape of lost circulation shape 32. The largest of lost circulation shape 32 has a maximum size. The maximum size of lost circulation shape 32 is such that a smallest maximum hypothetical sphere in which lost circulation shape 32 having the maximum size could fit has a diameter of 15 mm regardless of the geometric shape of lost circulation shape 32. In alternate embodiments, the maximum size of lost circulation shape 32 is such that a smallest maximum hypothetical sphere in which lost circulation shape 32 having the maximum size could fit has a diameter of 40 mm regardless of the geometric shape of lost circulation shape 32.

Lost circulation shape 32 can be formed of a metal, ceramic, or polymeric material. As an example, lost circulation shape 32 could be formed of any of a variety of suitable metallic materials, such as, for example, aluminum, titanium, copper, or nickel. Alternately, lost circulation shape 32 could be formed of any of a variety of suitable ceramic materials, such as, for example, gypsum, alumina, zircon, silicon nitride, glass, or silicate. Alternately, lost circulation shape 32 could be formed of any of a variety of suitable polymeric materials including plastic, thermoplastic and elastomers, such as, for example, acrylonitrile butadiene styrene (ABS), high-impact polystyrene (HIPS), polypropylene, polyethylene, nylon, acrylic, polyethylene terephthalate (PET), poly carbonate, or polyurethane.

Alternately, lost circulation shape 32 can be formed of other materials that are suitable for additive manufacturing, such as vat photopolymerisation, material extrusion, material jetting, binder jetting, powder bed fusion, direct energy deposition, and sheet lamination fabrication techniques.

The material used to form lost circulation shape 32 can be determined by the drilling application, the selected drilling fluid, and the lost circulation material 34 that is to be used for a particular application. In embodiments of this disclosure, lost circulation material 34 and lost circulation shape 32 can be used to solve a total loss situation where there is no need for removal of lost circulation material 34 and lost circulation shape 32. In other embodiments, lost circulation material 34 and lost circulation shape 32 could be formed of a removable material. As an example, lost circulation material 34 and lost circulation shape 32 could be formed of aluminum that could be dissolved and removed with an acid treatment.

Outer skin 36 of lost circulation shape 32 includes a plurality of perforations 38 that extend through outer skin 36. Perforations 38 provide fluid communication between an exterior of lost circulation shape 32 and the open interior chamber of lost circulation shape 32. Perforations 38 allow for drilling fluid to enter the open interior chamber of lost circulation shape 32. Because the drilling fluid can pass into and through lost circulation shape 32, minimal hydrostatic forces are applied to lost circulation shape 32 downhole. Larger perforations 38 will minimize the hydrostatic forces. However, if perforations 38 are too large, then lost circulation shape 32 will not trap lost circulation material 34. The size, shape, and number of perforations 38 can be optimized for each individual application. Alternately, a generic layout of perforations 38 can be developed with the size, shape, and number of perforations selected to function in a variety of subterranean wells 10.

Perforations 38 are sized to minimize or prohibit the passage of lost circulation material 34 between the exterior of lost circulation shape 32 and the open interior chamber of lost circulation shape 32. Perforations 38 are sized to trap lost circulation material 34 within lost circulation zone 22, forming a seal within lost circulation zone 22. As an example, perforations 38 can have dimensions that are smaller in size than lost circulation material 34 (FIG. 2). Alternately some commonly available lost circulation material 34 is capable of sealing cavities 30 that have a dimension larger than the size of lost circulation material 34. In certain embodiments the maximum size of perforations 38 will be smaller than the maximum bridging limitation of lost circulation material 34. In such embodiments the maximum size of perforations 38 can be larger than the size of lost circulation material 34 so that some lost circulation material 34 pass through perforations 38 before lost circulation material 34 bridges across lost circulation shape 32. Performance data can be obtained relating to the capabilities of currently available lost circulation material 34. Such performance data can include the size of cavities that can be sealed with such lost circulation material. The performance data for a selected lost circulation material can be referenced for determining a suitable size of perforations 38.

Figure 4:
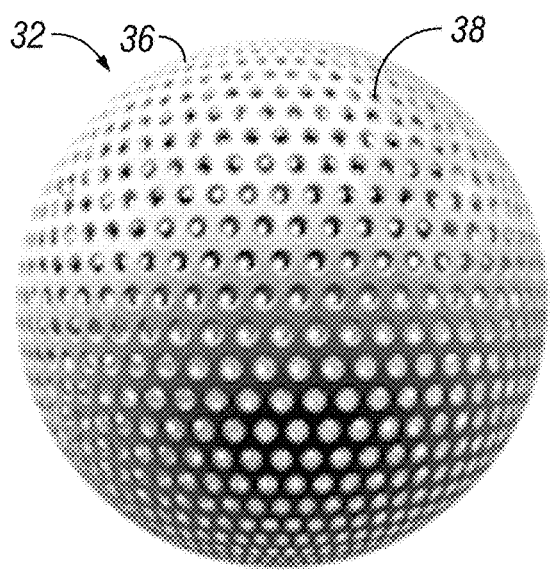
Figure 5:
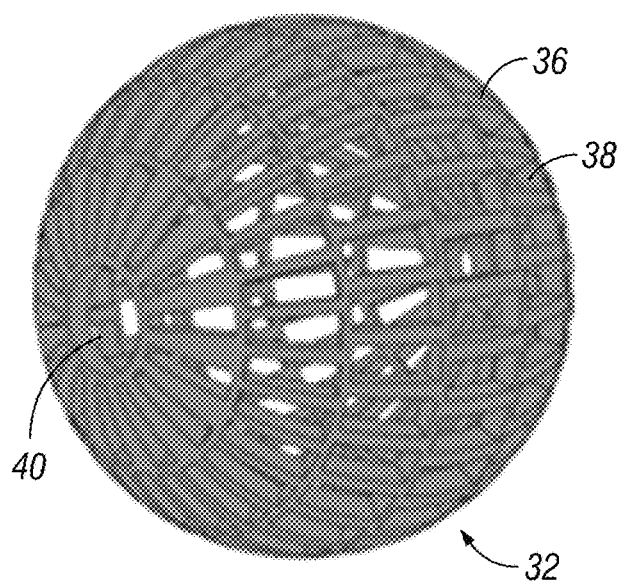
Figure 6:
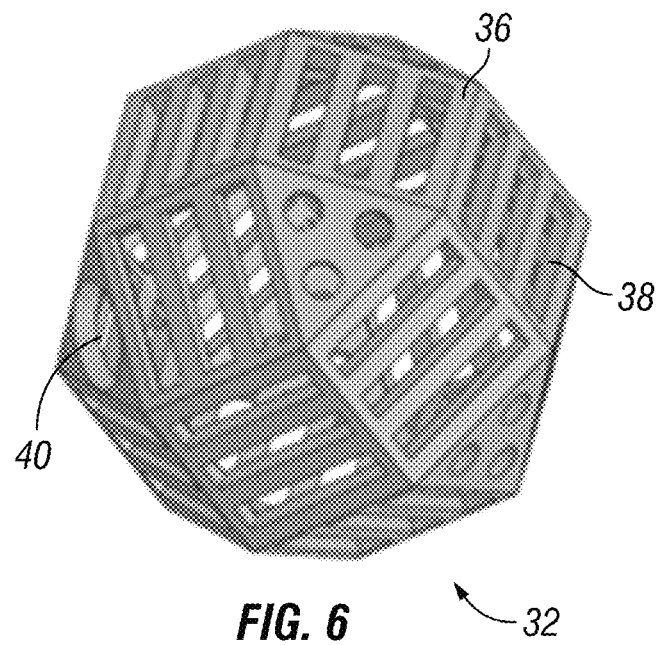
Figure 7:
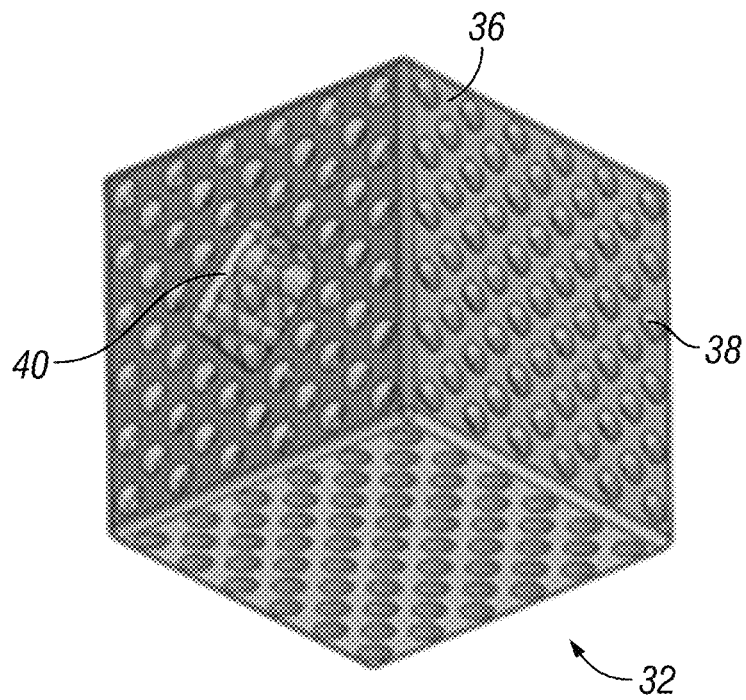

In the example of FIG. 3 perforations 38 through outer skin 36 of lost circulation shape 32 are diamond shaped. In the Example of FIGS. 4 and 7, perforations 38 through outer skin 36 of lost circulation shape 32 are circular. In the example of FIG. 5 perforations 38 through outer skin 36 of lost circulation shape 32 are four sided. Such perforations 38 can be generally rectangles, or frusto-conical shaped. In the example of FIG. 6 perforations 38 through outer skin 36 of lost circulation shape 32 can include both four sided shapes and circular shapes.

When perforations 38 are circular perforations 38 can have, for example, a size in a range of 1 mm to 4 mm in diameter. In alternate embodiments perforations 38 can have other shapes. For example purposes only, perforations 38 can be shaped as squares, hexagons, pentagons, triangles, rectangles, diamonds, circles or combinations of any of these shapes. The size, shape, and spacing of perforations 38 can be selected for optimized performance with a selected lost circulation material 34 (FIG. 2). If the number of perforations 38 is large enough that the structural integrity of lost circulation shape 32 is compromised, then structural members may be added within the open interior chamber of lost circulation shape 32.

Looking at FIGS. 5-7, lost circulation shape 32 can further include filling hole 40. Filling hole 40 extends through outer skin 36. In certain embodiments, filling hole 40 can have a diameter in a range of 2.5 mm to 5 mm. Filling hole 40 facilitates the filling of the open interior chamber with a wetting fluid. The wetting fluid can be, for example, a drilling fluid. In certain embodiments, the filling of lost circulation shape 32 could be assisted by holding the lost circulation shape under vacuum and then introducing wetting fluid. Alternately, a pressure can be applied instead of a vacuum for filling the open interior chamber with wetting fluid. Using a vacuum or pressure would be most useful when perforations 38 are sufficiently small that wetting fluid does not travel easily into the open interior chamber. Using a vacuum or pressure can overcome surface tension that could prevent the open interior chamber from filling with wetting fluid before lost circulation shape 32 is circulated downhole through drill string 16. Filling hole 40 may or may not be a requirement depending on the size and arrangement of perforations 38 and the resulting buoyancy of lost circulation shape 32 in the drilling fluid.

The density of lost circulation shape 32 together with the presence of wetting fluid within the open interior chamber of lost circulation shape 32 allow lost circulation shape 32 to have generally neutral buoyancy within the drilling fluid. As used in this disclosure, a generally neutral buoyancy means that the lost circulation shapes will flow with the drilling fluid and will not tend to sink or rise relative to the movement of the drilling fluid.

Because of the wetting fluid located within the open interior chamber of lost circulation shape 32, the average lost circulation shape density does not need to be absolutely equal to the drilling fluid density that is carrying lost circulation shape 32. The lost circulation shape 32 can be carried by the drilling fluid free of excessive sinking or rising of lost circulation shape 32 relative to the movement of the drilling fluid if an average lost circulation shape density is near to the density of the drilling fluid. As an example, in certain embodiments the difference between the average lost circulation shape density and the drilling fluid density is 20% or less of the drilling fluid density. In alternate example embodiments, the difference between the average lost circulation shape density and the drilling fluid density is 10% or less of the drilling fluid density.

For the sake of clarity, as an example, a drilling fluid density of some currently available drilling fluid can range from 8.0 pounds per gallon (ppg) to 20 ppg. If a drilling fluid with a density of 20 ppg is used, then 20% of 20 ppg is 4 ppg. In this example embodiment, if the difference between the average lost circulation shape density and the drilling fluid density is 20% or less of the drilling fluid density, then the average lost circulation shape density can be in a range of 16 ppg to 24 ppg. For the avoidance of doubt, the average lost circulation shape density is the density of lost circulation shape 32 calculated without the wetting fluid being locate within the open interior chamber.

In embodiments of this disclosure, a mixture of both lost circulation shape 32 and lost circulation material 34 is used to seal lost circulation zone 22. If some currently available lost circulation material only was used (with no lost circulation shape 32), the lost circulation material could flow into and out of cavities 30 without forming a seal. Some commonly used currently available lost circulation material would be too small relative to the cross sectional dimension X of cavity 30 for such lost circulation material to effectively and dependably seal lost circulation zone 22. If lost circulations shapes 32 were used alone, it is possible that with a sufficient number of lost circulations shapes 32 that eventually lost circulation zone 22 could be sealed. However, because perforations 38 through outer skin 36 could continue to allow for the flow of fluids into and out of the open interior chamber of lost circulation shapes 32, lost circulation would therefore only be somewhat restricted.

Figure 8:
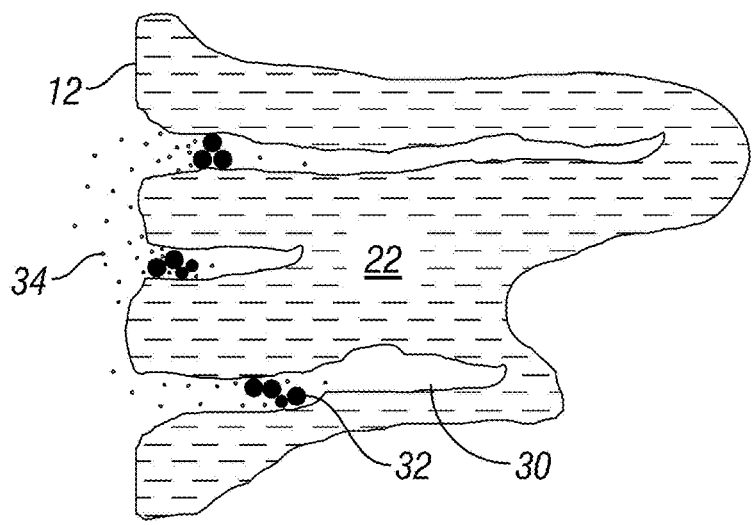
FIGS. 8-10 are section views of a lost circulation zone showing the progression of blocking the lost circulation zone with lost circulation shapes and lost circulation material, in accordance with an embodiment of this disclosure.
Figure 9:
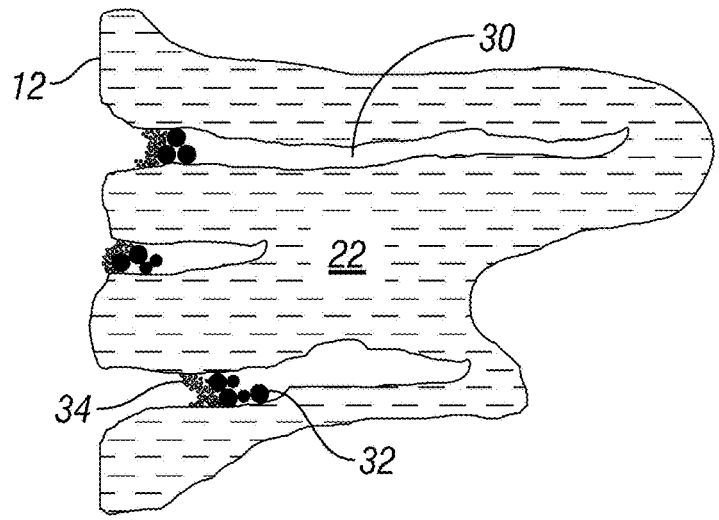

Looking at FIG. 8, lost circulation material 34, and lost circulation shape 32 can be used together and pumped into cavity 30. Looking at FIG. 9, by using both lost circulation shape 32 and lost circulation material 34, lost circulation shape 32 can be sized to be wedged into cavities 30 of lost circulation zone 22, forming a wedged lost circulation shape. With lost circulation shape 32 constrained within lost circulation zone, loss flow will continue through perforations 38. Due to the small size of perforations 38, lost circulation material 34 will collect and within and on the outer surfaces of lost circulation shape 32. Lost circulation material 34 can be trapped by the wedged lost circulation shape to seal lost circulation zone 22. Looking a FIG. 10, lost circulation material 34 will collect and bridge and cause a total plug and consequent pressure seal. During such process, lost circulation shape 32 may be deformed, collapse, or be crushed due to well bore pressure acting on the formation. Such pressure will force lost circulation shape 32 and lost circulation material 34 further into cavities 30, thereby giving a fully anchored seal. In alternate embodiments, lost circulation shape 32 may not be deformed, collapse or be crushed, but maintain its original 3-dimensional structure.

As disclosed in further detail, the mix of shapes and sizes of lost circulation shapes 32 can be tailored for a particular lost circulation zone 22 through the use of fixed data input, variable data input, or both fixed and variable data input. The formation plugging ability of lost circulation shape 32 and lost circulation material 34 will be dependent on the sizes of lost circulation shape 32 deployed, the combination of sizes of lost circulation shape 32 deployed, such as the ratio of the small to large sizes of the deployed mix of lost circulation shape 32, and the volume of lost circulation shapes 32 deployed. The sequence in which the shapes and sizes of lost circulation material 34 is delivered into wellbore 12 can further affect the plugging ability of lost circulation shape 32. As an example, a lost circulation mix delivery sequence can include delivering smaller sized lost circulation shapes 32 first, followed by larger sized lost circulation shapes 32, or a mix of small and large sized lost circulation shapes 32 delivered together, or larger sized lost circulation shapes 32 first, followed by smaller sized lost circulation shapes 32.

A packing density prediction model can be used in the process of selecting the lost circulation shapes 32 to be utilized. A packing density model would ensure that for a given cavity surface area, an optimized packing density of the lost circulation shape would be obtained to provide a net in which the lost circulation material 34 can accumulate to plug the cavity 30.

Additional factors such as the shape of lost circulation shape 32, the material used to form lost circulation shape 32, and the size, shape, number, and spacing of perforations 38 will also affect the plugging ability of lost circulation shape 32.

An optimum mix of lost circulation shape 32 and lost circulation material 34 that can be used to seal lost circulation zone 22, as well as the optimum sequence for delivering the lost circulation shape 32 and lost circulation material 34 can be determined. A fixed data set can be determined and evaluated in order to determine the lost circulation mix and delivery sequence. The fixed data set can include, for example, geophysical data of lost circulation zone 22, an available range of lost circulation shape data, and an available range of lost circulation material data.

Geophysical data of lost circulation zone 22 can include, for example, information relating to the formation and to cavity 30. Geophysical data can include the type of formation, the cavity surface area, and dispersion. The available range of lost circulation shape data can include the combination of size and shape of lost circulation shapes 32 that are available to be delivered into wellbore 12. The available range of lost circulation shape data can further include the range of possible size, shape, number, and orientation of perforations 38 that can be part of lost circulation shape 32. The lost circulation shapes 32 will be selected to ensure maximum plugging and flow with respect to the lost circulation material 34.

The available range of lost circulation material data can include details relating to possible lost circulation material 34 that can be delivered into wellbore 12. As an example, the range of lost circulation material data can include the type, size, shape, and other specifics relating to a lost circulation material can be delivered into wellbore 12.

An initial lost circulation mix can be determined using the fixed data set. The initial lost circulation mix is the selected combination of lost circulation shapes 32 and lost circulation material 34 that can be initially delivered into wellbore 12. In certain embodiments, the initial lost circulation mix can include a wetting fluid. The wetting fluid can be located within the open interior chamber of lost circulation shape 32, and can be used as a fluid stream for the delivery of the lost circulation mix into wellbore 12.

In embodiments, the delivery sequence for both the lost circulation shapes 32 and the lost circulation material 34 of the lost circulation mix can also be determined by the using the fixed data set. As an example, the initial lost circulation mix delivery sequence can be calculated from the fixed data set, for delivering the initial lost circulation mix into subterranean well 10.

In embodiments, the initial lost circulation mix and the initial lost circulation mix delivery sequence can alternately be determined by assessing variable data. The variable data can include data regarding the flow in and the flow out of subterranean well 10. The volume loss rate of fluids flowing out of subterranean well 10 compared to fluids that are flowing into subterranean well 10 can be included as input data for the initial calculation of the initial lost circulation mix.

As an example, the variable data can include a drill string downhole flow rate, and an annulus uphole flow rate. Before, during, and after delivery of the initial lost circulation mix the drill string downhole flow rate can be determined. The drill string downhole flow rate is the volumetric flow rate of the flow of drilling fluid and lost circulation mix that is being delivered in a downhole direction through drill string 16.

Before, during, and after delivery of the initial lost circulation mix the annulus uphole flow rate can also be determined. The annulus uphole flow rate is the volumetric flow rate of the flow of drilling fluid that is being returned to the surface in an uphole direction through annular space 26. By calculating the difference between the annulus uphole flow rate and the drill string downhole flow rate, the amount of fluids being lost can be determined. In a total loss situation, all of the drilling fluid would be lost into the lost circulation zone 22 and there would be no annulus uphole flow rate.

The calculated difference between the annulus uphole flow rate and the drill string downhole flow rate can be evaluated before the delivery of the initial lost circulation mix to arrive at an initial loss volume. In certain embodiments, this initial loss volume can be used to determine the composition of the initial lost circulation mix and the initial lost circulation mix delivery sequence.

The initial lost circulation mix can be delivered into subterranean well 10 12 in the initial lost circulation mix delivery sequence. In order to make adjustments to the lost circulation mix being delivered into wellbore 12 of subterranean well 10, the variable data can be measured and evaluated during and after delivery of the initial lost circulation mix can be delivered into subterranean well 10. As an example, during the delivery of the lost circulation mix into wellbore 12, a revised drill string downhole flow rate and a revised annulus uphole flow rate can be measured and a revised loss volume can be calculated. This revised loss volume can be evaluated as an indication of the success of the initial lost circulation mix in plugging cavities 30.

The feedback data obtained from determining the revised loss volume can be used to determine if alterations to the characteristics of the lost circulation shape 32, the lost circulation material 34, or the wetting fluid is required. If the loss volume has not be sufficiently reduced by the initial lost circulation mix, a revised lost circulation mix can be developed from the revised loss volume information and the revised lost circulation mix can be delivered into subterranean well 10. The variable data can also be used to determine a revised lost circulation mix delivery sequence. The revised lost circulation mix can be delivered into subterranean well 10 in the revised lost circulation mix delivery sequence.

Figure 11:
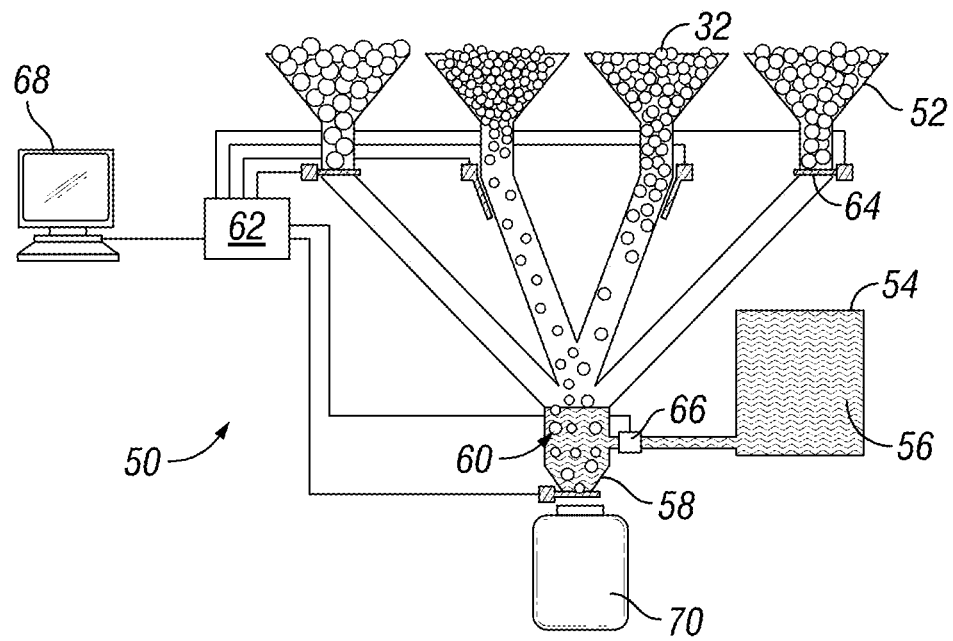
FIG. 11 is a schematic section view of a batch disposal system, in accordance with an embodiment of this disclosure.

Looking at FIG. 11, batch disposal system 50 can be used to prepare the mix of lost circulation shape 32 to be delivered into wellbore 12 of subterranean well 10. In the example embodiment of FIG. 11, batch disposal system 50 can include multiple supply hoppers 52. Each supply hopper 52 can contain a lost circulation shape 32 of the available range of lost circulation shapes 32. Lost circulation shapes 32 contained within supply hoppers 52 can be pre-manufactured so that supply hoppers 52 have stock product.

Batch disposal system 50 can also include wetting fluid tank 54. Wetting fluid tank 54 can contain wetting fluid 56. Wetting fluid 56 can be, for example, the drilling fluid used during drilling operations in wellbore 12. In alternate embodiments, wetting fluid 56 can be another drilling fluid.

Each supply hopper 25 and wetting fluid tank 54 are in fluid communication with wetting unit 58. Lost circulation shapes 32 and wetting fluid 56 can both be delivered into wetting unit 58 for mixing lost circulation shapes 32 with wetting fluid 56. Wetting unit 58 can also facilitate the filling of the open interior chamber of lost circulation shapes 32 with wetting fluid 56. As an example, wetting unit 58 can provide a vacuum and as wetting fluid 56 is delivered to wetting unit 58 the vacuum can cause wetting fluid 56 to enter the open interior chamber of lost circulation shape 32 by way of filling hole 40 (FIGS. 5-7). Alternately, wetting unit 58 can provide a pressure instead of a vacuum for filling the open interior chamber of lost circulation shape 32 with wetting fluid 56.

Wetting unit 58 can provide sufficient vacuum or pressure such that the open interior space of lost circulation shapes 32 are completely full and wetted with wetting fluid 56 to ensure that no air is trapped within lost circulation shape 32, which would affect the neutral buoyancy of lost circulation shape 32 within the drilling fluid. The introduction of wetting fluid into wetting unit 58 also acts as the lost circulation shape transport medium to carry lost circulation shapes 32 within wellbore 12. Wetting unit 58 can include sensor 60 that can signal control unit 62 when a batch of lost circulation shape 32 has been fully combined and wetted.

Sensor 60 can be, for example, a pressure sensor, a mass sensor, an optical sensor, or a combination of these and other sensors.

Control unit 62 of batch disposal system 50 can be used to control the amount of lost circulation shapes 32 being delivered into wetting unit 58 from supply hoppers 52. Control unit 62 can move hopper control valve 64 between an open position and a closed position. Each supply hopper 52 can be associated with a separate hopper control valve 64. When hopper control valve 64 is in the closed position, lost circulation shapes 32 located within the supply hopper 52 associated with that hopper control valve 64 is blocked from traveling from supply hopper 52 to wetting unit 58.

When hopper control valve 64 is in the open position, lost circulation shapes 32 located within the supply hopper 52 associated with that hopper control valve 64 can travel from supply hopper 52 to wetting unit 58. A hopper sensor can be used to measure or count the amount of lost circulation shapes 32 that is delivered from supply hopper 52 to wetting unit 58 while the hopper control valve 64 is in the open position.

Control unit 62 can further be used to control the amount of wetting fluid 56 being delivered into wetting unit 58 from wetting fluid tank 54. Control unit 62 can move tank control valve 66 between an open position and a closed position. When tank control valve 66 is in the closed position, wetting fluid 56 located within wetting fluid tank 54 is blocked from traveling from wetting fluid tank 54 to wetting unit 58.

When tank control valve 66 is in the open position, wetting fluid 56 located within wetting fluid tank 54 can travel from wetting fluid tank 54 to wetting unit 58. A tank sensor can be used to measure the amount of wetting fluid 56 that is delivered from wetting fluid tank 54 to wetting unit 58 while the tank control valve 66 is in the open position.

Operator interface 68 can be used to communicate with control unit 62. Operator interface 68 can, for example, provide instructions to control unit 62 to instruct batch disposal system 50 to prepare the mix of lost circulation shape 32 to be used in the lost circulation mix. Operator interface can also be used to display the status of the sensors and valves of batch disposal system 50, to display the fixed data, to display the historical and current variable data, to assist in calculating the optimal lost circulation mix from the fixed and variable data, and to perform other tasks associated with the sealing of lost circulation zone 22.

After the lost circulation shapes 32 have been filled and wetted with wetting fluid 56, the filled and wetted lost circulation shapes 32 can be delivered into discharge unit 70. Discharge unit 70 can be a container that is filled with the wetted lost circulation shapes 32. The container can be used to transport the wetted lost circulation shapes 32 to the uphole end of the wellbore 12. Alternately, the container can feed directly through the drilling floor into subterranean well 10.

Figure 12:
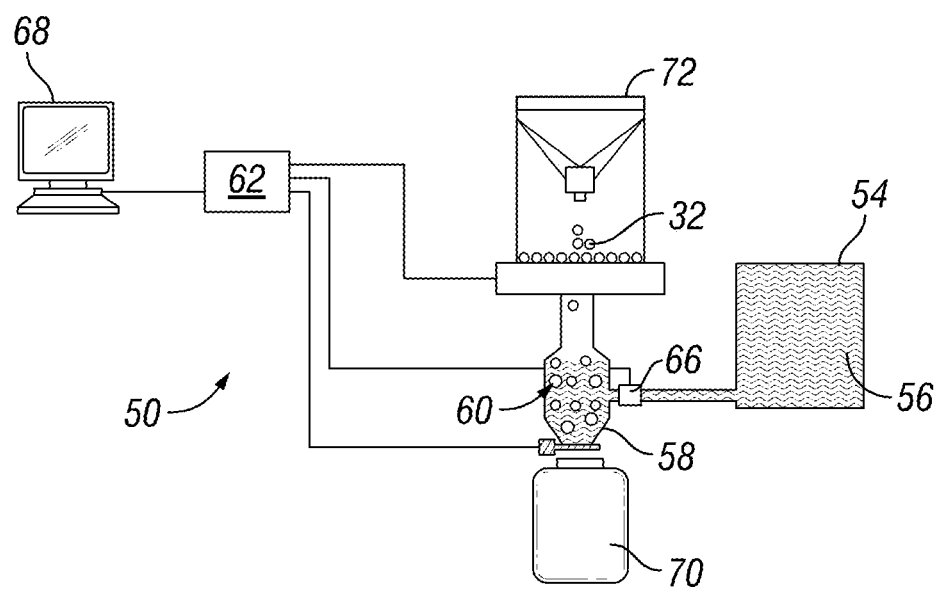
FIG. 12 is a schematic section view of a batch disposal system, in accordance with an alternate embodiment of this disclosure.

Looking at FIG. 12, in an alternate example embodiment, instead of using stock lost circulation shapes 32, batch disposal system 50 can include additive manufacturing unit 72. Additive manufacturing unit 72 can be used to form lost circulation shapes 32. Additive manufacturing unit can form lost circulation shapes 32 by vat photopolymerisation, material extrusion, material jetting, binder jetting, powder bed fusion, direct energy deposition, or sheet lamination fabrication techniques. Additive manufacturing unit 72 can form any lost circulation shape 32 within the available range of lost circulation shapes.

Additive manufacturing unit 72 can be in communication with wetting unit 58. Control unit 62 can control the lost circulation shapes 32 being formed by additive manufacturing unit 72 and delivered into wetting unit 58. Control unit 62 can further be used to control the amount of wetting fluid 56 being delivered into wetting unit 58 from wetting fluid tank 54. After the lost circulation shapes 32 have been filled and wetted with wetting fluid 56, the filled and wetted lost circulation shapes 32 can be delivered into discharge unit 70.

Figure 13:
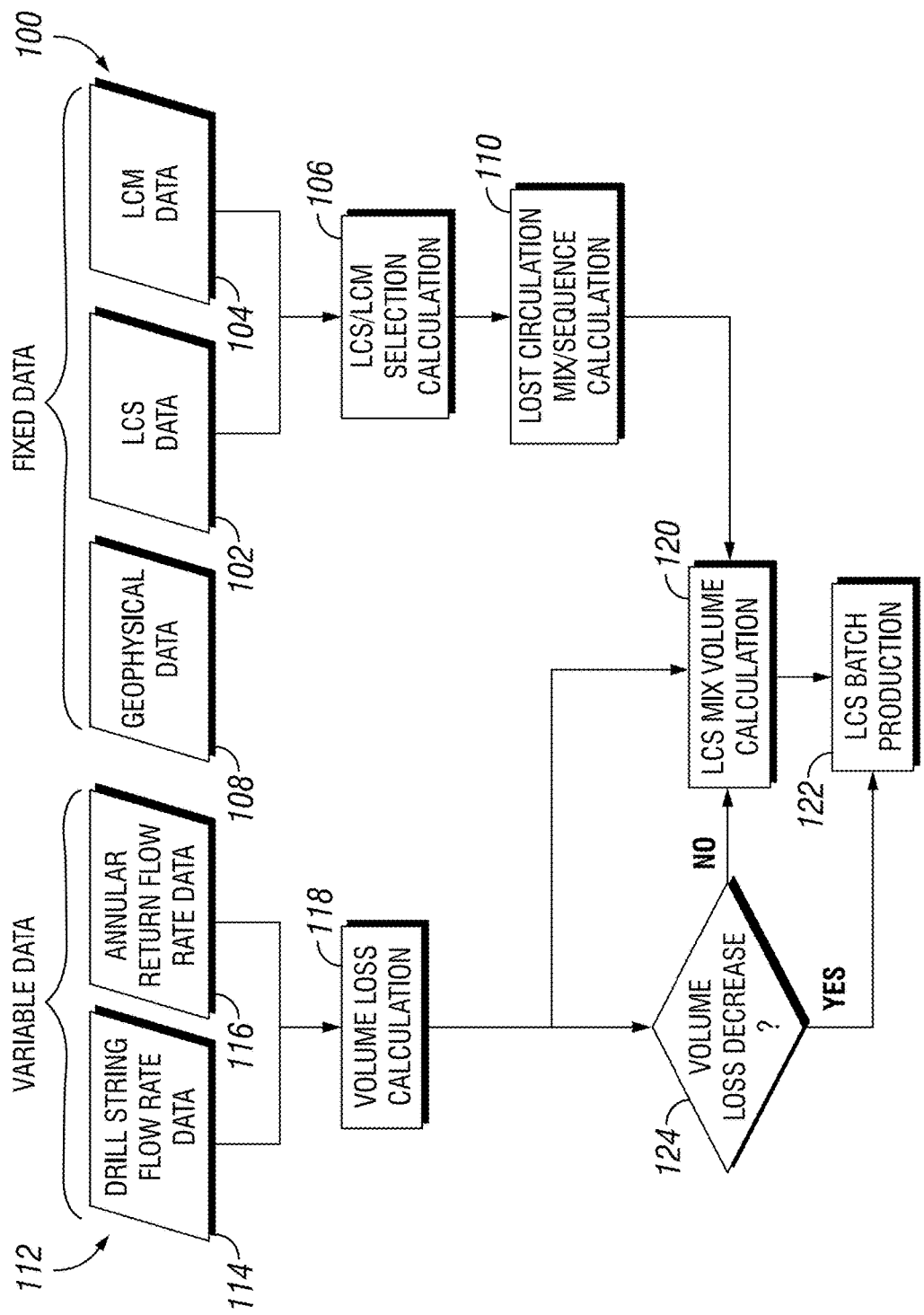
FIG. 13 is a flow diagram of steps for a method using a batch disposal system, in accordance with an embodiment of this disclosure.

In an example of operation, looking at FIG. 13, in step 100 fixed data can be provided. The fixed data can include in step 102 the available range of lost circulation shape data "LCS Data." In step 104, the available range of lost circulation material data "LCM Data" can be provided. In step 106 the available range of lost circulation shape data and the available range of lost circulation material data can be used for the selection calculation of lost circulation shapes 32 and lost circulation material 34 to be used in the initial lost circulation mix.

In step 108, the geophysical data can be provided. In step 110 the fixed data can be used to calculate the initial lost circulation mix as well as the initial delivery sequence for the initial lost circulation mix.

In step 112, the variable data can be provided. The variable data can include the initial drill string downhole flow rate data that is provided in step 114 and the initial annulus uphole flow rate data that is provided in step 116. The initial loss volume can be calculated in step 118 from the initial drill string downhole flow rate data and the initial annulus uphole flow rate data. In step 120 the initial lost circulation mix volume can be calculated using both the variable data and the fixed data. Having obtained the lost circulation mix, sequence, and volume, the batch of lost circulation shapes 32 to be used in the initial lost circulation mix can be produced in step 122 by batch disposal system 50.

During the delivery of the initial lost circulation mix into subterranean well 10, revised variable data can be determined by repeating step 114 to determine a revised drill string downhole flow rate data and repeating step 116 to determine a revised annulus uphole flow rate data. The revised loss volume can be calculated in step 118 from the revised drill string downhole flow rate data and the revised annulus uphole flow rate data. This revised loss volume can be compared to the initial loss volume to determine in step 122 if the volume loss has decreased.

If there has been no decrease in the volume loss, or if there has been an unsatisfactory decrease in the volume loss, then the lost circulation mix volume can be adjusted to arrive at a revised lost circulation mix. A batch of lost circulation shapes 32 to be used in the revised lost circulation mix can be produced in step 122 by batch disposal system 50. If there has been a satisfactory decrease in the volume loss, then batch disposal system 50 can continue to produce the batch of lost circulation shapes 32 that was used in the initial lost circulation mix.

Looking at FIG. 2, when delivering the lost circulation mix into subterranean well 10, lost circulation shape 32 and lost circulation material 34 are circulated downhole through drill string 16 with drilling fluid. The drilling fluid can be formulated for the particular conditions of wellbore 12. The drilling fluid can be, for example, a water based mud, an oil based mud, or a synthetic based mud.

Lost circulation shape 32 and lost circulation material 34 can be introduced into drill string 16 at surface 14 and can exit drill string 16 through circulating sub port 28. Because lost circulation shape 32 is generally neutrally buoyant in the drilling fluid, the pumping time required for delivering lost circulation material 34 to lost circulation zone 22 can be calculated by volume displacement methods, which is well understood in the art of circulating fluids in wellbores.

During the process of delivering lost circulation shape 32 and lost circulation material 34 downhole, if drilling operations could continue for a process that used only the lost circulation material 34, this process would not change with the addition of lost circulation shape 32. Therefore, embodiments for delivering the lost circulation shape 32 and lost circulation material 34 downhole could be undertaken while drilling operations continue and without having to remove drill string 16 from wellbore 12. The addition of lost circulation shape 32 may not otherwise change the lost circulation sealing procedure.

Figure 14:
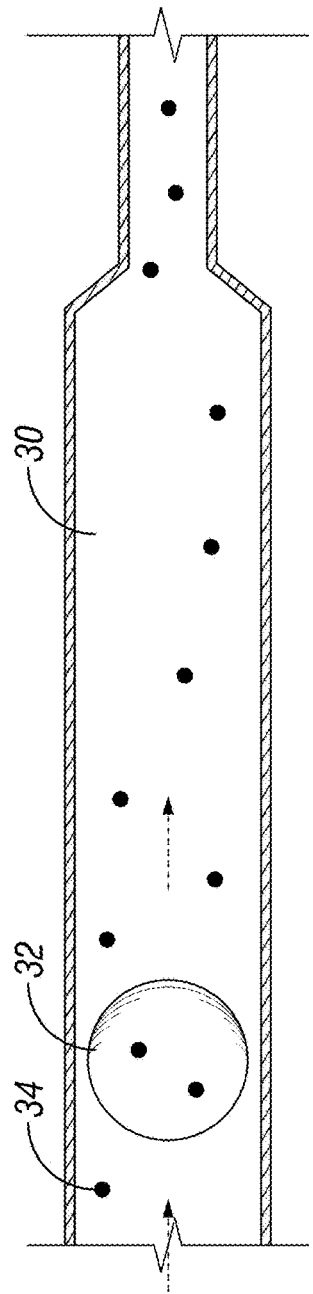
FIGS. 14-16 are detailed schematic section views of cavity of a lost circulation zone showing the progression of blocking the lost circulation zone with lost circulation shapes and lost circulation material, in accordance with an embodiment of this disclosure.
Figure 15:
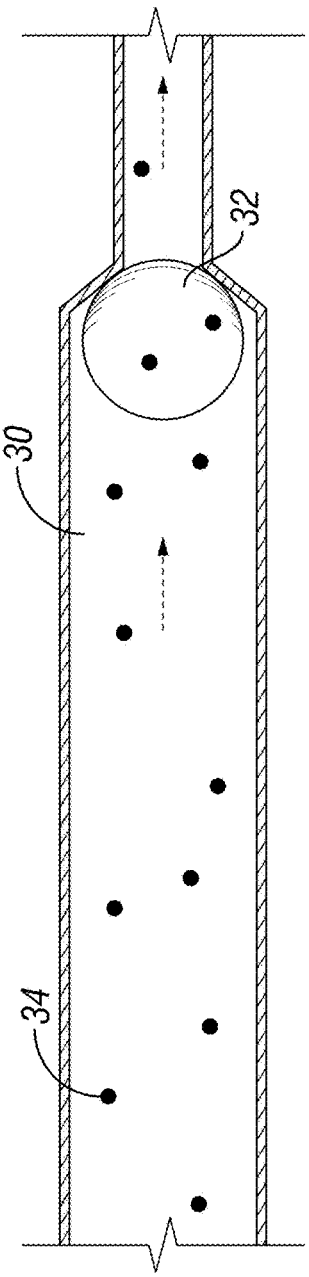

Looking at FIGS. 8 and 14, lost circulation shape 32 and lost circulation material 34 enter cavity 30. Looking at FIGS. 9 and 15, lost circulation shape 32 can become wedged within cavity 30. Looking at FIGS. 10 and 16, as drilling fluid continues to pass through lost circulation shape 32, lost circulation material 34 can become lodged in or against lost circulation shape 32 until a complete formation fault pressure seal is obtained. As lost circulation shape 32 is trapped and lost circulation zone 22 becomes blocked this will result in a pressure differential creation across the blockage formed by lost circulation shape 32 due to the drilling overbalance hydrostatic pressure.

Figure 10:
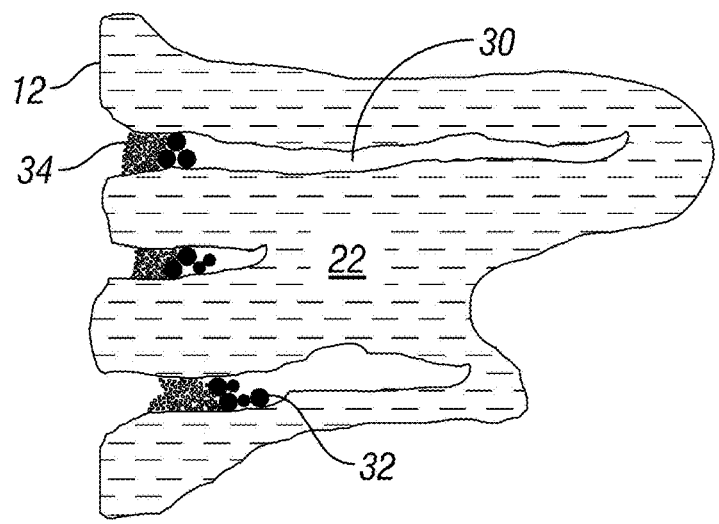
Figure 16:
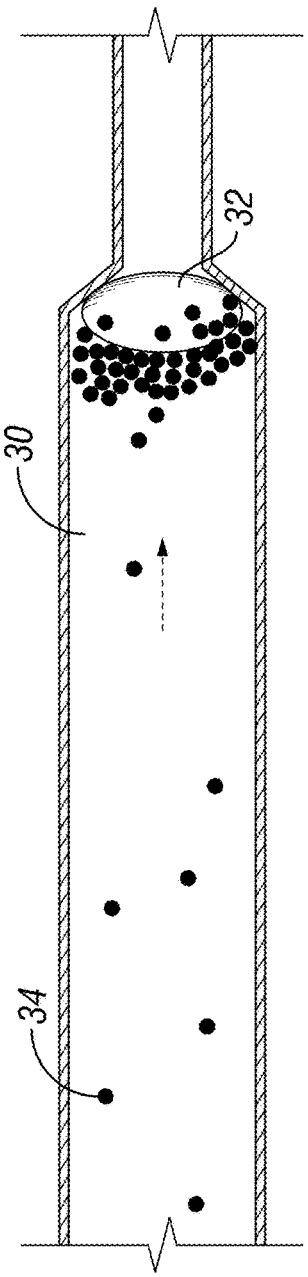

In the example embodiments of FIGS. 10 and 16, lost circulation shape 32 has deformed, collapsed or been crushed within cavity 30. A crushed lost circulation shape 32 could trap lost circulation material more quickly than uncrushed lost circulation shape 32. In addition, a crushed lost circulation shape 32 could become lodged deeper into cavity 30, providing a more secure seal of lost circulation zone 22 (FIG. 1).

Lost circulation shape 32 is sized to be wedged into cavities 30 of lost circulation zone 22, forming a wedged lost circulation shape. Lost circulation material 34 is then trapped by the wedged lost circulation shape to seal lost circulation zone 22.

Embodiments described in this disclosure therefore provide systems and methods that are capable of sealing a lost circulation zone with cavities that are larger than those that can be sealed with currently available lost circulation material. Systems and methods provide for delivery to the lost circulation zone 22 without the need for a specific secondary remedial bottom hole assembly or the need for a longer, adapted, or revised sealing operation.

Embodiments of this disclosure, therefore, are well adapted to carry out the objects and attain the ends and advantages mentioned, as well as others that are inherent. While embodiments of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure and the scope of the appended claims.

What is claimed is:

1. A method for sealing a lost circulation zone associated with a subterranean well, the method including:
    determining geophysical data of the lost circulation zone;
    providing an available range of lost circulation shape data;
    providing an available range of lost circulation material data, where the geophysical data, the available range of lost circulation shape data, and the available range of lost circulation material data are part of a fixed data set;
    determining an initial lost circulation mix from the fixed data set;
    determining an initial lost circulation mix delivery sequence from the fixed data set;
    determining an initial drill string downhole flow rate and an initial annulus uphole flow rate and calculating an initial loss volume;
    delivering the initial lost circulation mix into the subterranean well, including delivering the initial lost circulation mix in the initial lost circulation mix delivery sequence; and determining a revised drill string downhole flow rate and a revised annulus uphole flow rate and calculating a revised loss volume.

2. The method of claim 1, where the initial lost circulation mix delivery sequence determined from the fixed data set includes a sequence in which shapes and sizes of lost circulation shapes are delivered into the subterranean well, and where delivering the initial lost circulation mix into the subterranean well includes delivering the sequence of the shapes and the sizes of the lost circulation shapes of the initial lost circulation mix in the initial lost circulation mix delivery sequence.

3. The method of claim 1, further including determining a revised lost circulation mix from the revised loss volume and delivering the revised lost circulation mix into the subterranean well.

4. The method of claim 3, further including determining a revised lost circulation mix delivery sequence from the revised loss volume, and where delivering the revised lost circulation mix into the subterranean well includes delivering the revised lost circulation mix in the revised lost circulation mix delivery sequence.

5. The method of claim 1, where the geophysical data includes a cavity surface area.

6. The method of claim 1, where providing the available range of lost circulation shape data includes providing the available range of lost circulation shape data for a lost circulation shape that is a hollow body having an outer skin and an open interior chamber filled with a wetting fluid, where the outer skin includes a plurality of perforations that extend through the outer skin, providing fluid communication between an exterior of the lost circulation shape and the open interior chamber.

7. The method of claim 1, where delivering the initial lost circulation mix into the subterranean well includes filling an open interior chamber of a lost circulation shape with a wetting fluid and the lost circulation shape has a lost circulation shape density, and where a difference between the lost circulation shape density and a drilling fluid density is 20% or less of the drilling fluid density.

8. The method of claim 6, where:
    the lost circulation shape has a minimum size and a maximum size, where:
        the minimum size of the lost circulation shape is such that a smallest minimum sphere in which the lost circulation shape having the minimum size could fit has a diameter of 5 mm; and
        the maximum size of the lost circulation shape is such that a smallest maximum sphere in which the lost circulation shape having the maximum size could fit has a diameter of 15 mm;
    at least one of the plurality of perforations is a filling hole extending through an outer skin, the filling hole sized to provide for filling the open interior chamber with a wetting fluid and having a diameter in a range of 2.5 mm to 5 mm, and the other of the plurality of perforations sized to prohibit a passage of lost circulation material between the exterior of the lost circulation shape and the open interior chamber.

9. The method of claim 1, where a lost circulation shape is sized to be introduced into cavities of the lost circulation zone, forming a wedged lost circulation shape and the method further includes trapping lost circulation material with the wedged lost circulation shape to seal the lost circulation zone.

10. The method of claim 1, where an annular space is defined between an outer diameter surface of a drill string and an inner diameter surface of a wellbore of the subterranean well, and where delivering the initial lost circulation mix into the subterranean well includes circulating the initial lost circulation mix through the drill string within a drilling fluid traveling downhole within the drill string, through a circulating port, and into the annular space.

* * * * *